(12) United States Patent
Asano (10) Patent No.: US 11,891,840 B2
(45) Date of Patent: Feb. 6, 2024

(54) SAFETY DOOR DEVICE AND SAFETY DOOR LOCKING METHOD (71) Applicant: FANUC CORPORATION, Yamanashi (JP)

(72) Inventor: Keita Asano, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 585 days.

(21) Appl. No.: 17/123,660

(22) Filed: Dec. 16, 2020

(65) Prior Publication Data
US 2021/0189774 A1 Jun. 24, 2021

(30) Foreign Application Priority Data
Dec. 19, 2019 (JP) .................. 2019-229022

(51) Int. Cl.
E05B 77/54 (2014.01)
E05B 81/64 (2014.01)
E05B 77/48 (2014.01)
E05B 47/00 (2006.01)

(52) U.S. Cl.
CPC .......... E05B 77/54 (2013.01); E05B 47/0046 (2013.01); E05B 77/48 (2013.01); E05B 81/64 (2013.01); E05B 2047/0067 (2013.01); E05Y 2900/531 (2013.01)

(58) Field of Classification Search
CPC ..... E05B 2047/0016; E05B 2047/0036; E05B 2047/0067; E05B 2047/0068; E05B 2047/0069; E05B 47/0046; E05B 47/0603; E05B 47/0696; F16P 3/08; F16P 3/10; H01H 27/002; H01H 27/007; H01H 9/20; H01H 9/28; Y10T 292/1021; Y10T 292/696; Y10T 292/699
See application file for complete search history.

(56) References Cited

U.S. PATENT DOCUMENTS 8,494,680 B2 * 7/2013 Sparenberg ........... E05B 47/026 292/144
11,384,564 B2 * 7/2022 Grimm .................. H01H 27/06
(Continued)

FOREIGN PATENT DOCUMENTS

CN 109648393 A 4/2019
JP 2001138173 A 5/2001
(Continued)

Primary Examiner — Christine M Mills
Assistant Examiner — Christopher F Callahan
(74) Attorney, Agent, or Firm — Robert P. Michal, Esq.; Carter, DeLuca & Farrell LLP (57) ABSTRACT A safety door device according to an aspect includes: a full closing detector for detecting that a safety door has fully closed from an opened state; a locking mechanism for locking the safety door so that the safety door does not open; a measurement unit (acceleration sensor, control unit for measuring a travel acceleration, a travel speed, or a travel time when the safety door closes; and a control unit for controlling the locking mechanism to lock the safety door when the safety door is detected to be fully closed. If the travel acceleration or the travel speed is greater than a first threshold, or if the travel time is shorter than a second threshold, then the control unit does not cause the safety door to be locked.

10 Claims, 4 Drawing Sheets (56) References Cited

U.S. PATENT DOCUMENTS

| | | | | |
|---|---|---|---|---|
| 2002/0070564 A1* | 6/2002 | Ohta | ............... | E05B 81/20 |
| | | | | 292/201 |
| 2010/0038217 A1* | 2/2010 | Bretschneider | ........... | F16P 3/08 |
| | | | | 200/43.16 |
| 2011/0066288 A1* | 3/2011 | Sparenberg | ............... | F16P 7/00 |
| | | | | 292/144 |
| 2013/0276489 A1* | 10/2013 | Timmermann | ......... | E05F 15/60 |
| | | | | 70/277 |
| 2018/0187834 A1* | 7/2018 | Phay | ............... | F16P 3/10 |

FOREIGN PATENT DOCUMENTS

| | | | | | |
|---|---|---|---|---|---|
| JP | 2002137144 | A | 5/2002 | | |
| JP | 2009214214 | A | 9/2009 | | |
| JP | 2010-005759 | A | 1/2010 | | |
| JP | 2014233823 | A | 12/2014 | | |
| JP | 2017109286 | A | 6/2017 | | |
| KR | 1020080026372 | A | 3/2008 | | |
| WO | WO-2014163191 | A1 * | 10/2014 | ............. | E05B 45/06 |

\* cited by examiner

SAFETY DOOR DEVICE AND SAFETY DOOR LOCKING METHOD

CROSS-REFERENCE TO RELATED APPLICATION

This application is based upon and claims the benefit of priority from Japanese Patent Application No. 2019-229022 filed on Dec. 19, 2019, the contents of which are incorporated herein by reference.

BACKGROUND OF THE INVENTION

Field of the Invention

The present invention relates to a safety door device used to ensure the safety of work and a method of locking the safety door.

Description of the Related Art

A machine may be equipped with a safety door in order to ensure the safety of work (for example, refer to Japanese Laid-Open Patent Publication No. 2010-005759). Machines such as machine tools, injection molding machines, press machines, etc. have work areas in which cutting tools or molds operate, and it would be dangerous, for example if a worker puts his or her hand into such an area. The safety door closes the work area while the machine is in operation, so as to ensure the safety of work. That is, a locking mechanism operates to lock the safety door when the safety door is closed, and the operation of the machine is started after that.

SUMMARY OF THE INVENTION

However, if a safety door is closed rapidly, the locking mechanism etc. will be subjected to an impact as the safety door bounces and may be damaged. An object of the present invention is to provide a safety door device and safety door locking method that prevents damage when the safety door is closed rapidly.

A safety door device according to an aspect includes: a full closing detector configured to detect that a safety door has fully closed from an opened state; a locking mechanism configured to lock the safety door so that the safety door does not open; a measurement unit configured to measure a travel acceleration, a travel speed, or a travel time when the safety door closes; and a control unit configured to, when the safety door is detected to be closed, control the locking mechanism to lock the safety door, the control unit being further configured not to cause the safety door to be locked if the travel acceleration or the travel speed is greater than a first threshold, or if the travel time is shorter than a second threshold.

The present invention thus provides a safety door device and safety door locking method that prevents damage when the safety door is closed rapidly.

The above and other objects, features, and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIGS. 3A, 3B and 30 are schematic diagrams illustrating a key switch in detail.

DESCRIPTION OF THE PREFERRED EMBODIMENTS

Figure 1:
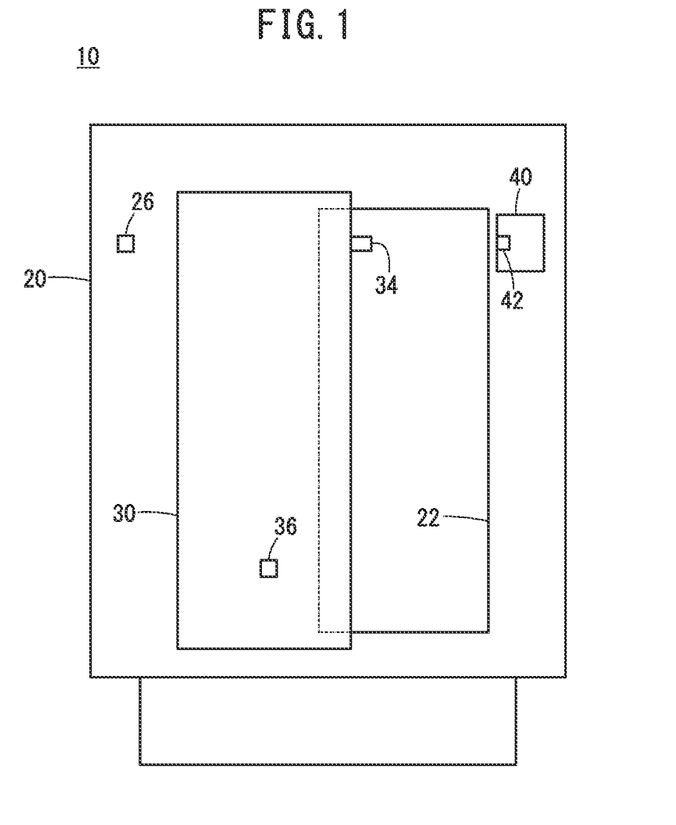
FIG. 1 is a schematic diagram illustrating a machine configuration of a safety-door-equipped machine device according to an embodiment.
Figure 2:
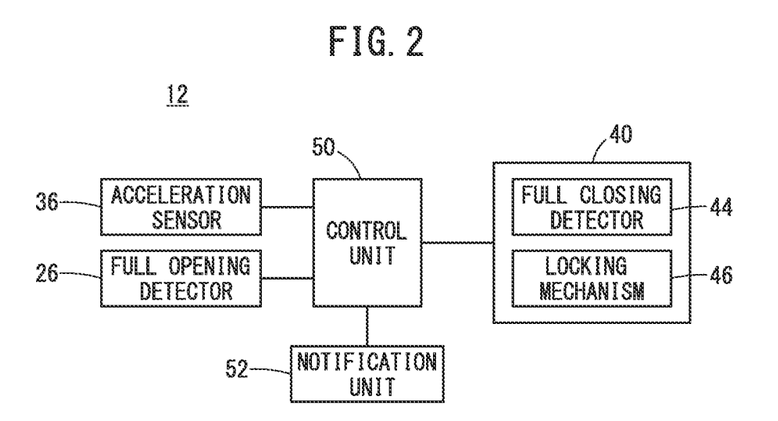
FIG. 2 is a block diagram illustrating a control configuration of the safety-door-equipped machine device.

A safety-door-equipped machine device 10 and a method of locking a safety door 30 according to an embodiment will be described below. FIGS. 1 and 2 respectively illustrate a machine configuration and a control configuration of the safety-door-equipped machine device 10 of the embodiment.

As shown in FIG. 1, the safety-door-equipped machine device 10 has a machine device body (not shown) that is installed within a cover 20, and an opening 22 thereof is opened and closed by the safety door 30. The safety-door-equipped machine device 10 is further provided with a safety door device 12 (see FIG. 2), which opens, closes, and locks the safety door 30 and controls these operations. The safety door device 12 includes a full opening detector 26, a key 34, an acceleration sensor 36, a key switch 40 (a full closing detector 44, a locking mechanism 46), a control unit 50, and a notification unit 52.

The full opening detector 26 is a switch of contact type or proximity type that is provided on the cover 20, for example, and is situated in proximity to or contact with the safety door 30 when the safety door 30 is fully open and detects that the safety door 30 is fully open. When the state of detection by the full opening detector 26 changes from detection of full opening to non-detection thereof, it means that the safety door 3C has started moving (detection of the beginning of movement).

The key 34 is held so as to protrude from the safety door 30 (see FIG. 1). When the safety door 30 is closed, the key 34 is inserted into a key insertion hole 42 of the key switch 40, and the key 34 is pulled out from the key insertion hole 42 when the safety door 30 is opened.

The acceleration sensor 36 (measurement unit) is provided on the safety door 20 and detects a travel acceleration α that is applied to the safety door 30.

The key switch 40 (the full closing detector 44, locking mechanism 46) detects full closing of the safety door 30 and locks the safety door 30 by using the key 34.

Figure 3A:
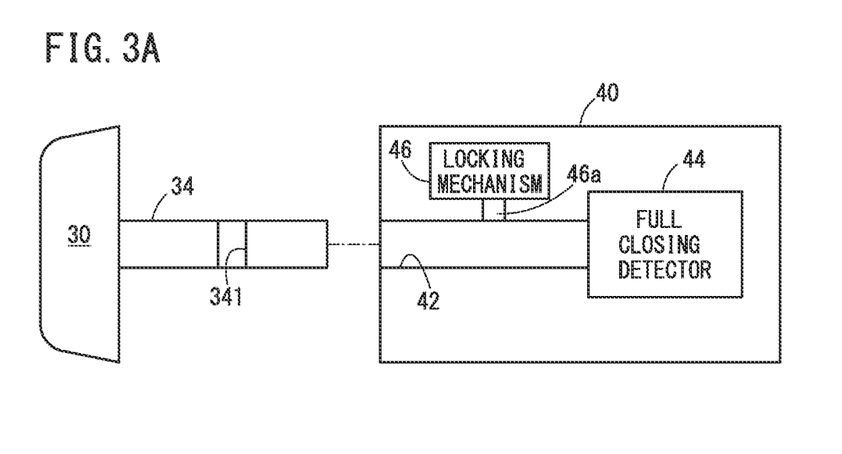
Figure 3B:
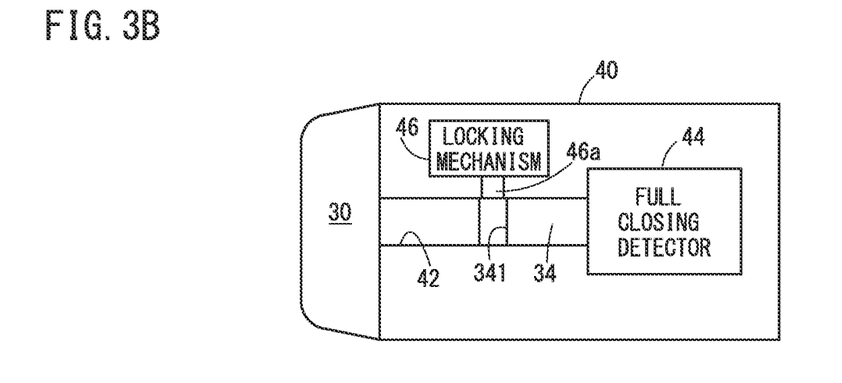
Figure 3C:
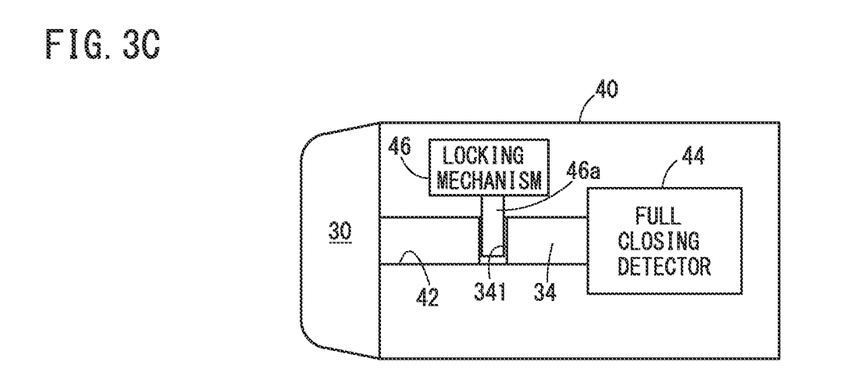

FIGS. 3A to 3C illustrate an internal configuration of the key switch 40. FIGS. 3A to 3C respectively illustrate the states of the key switch 40 (1) before the key 34 is inserted (after the key 34 is pulled out), (2) after the key 34 is inserted, (3) after the key 34 is inserted and locked.

The full closing detector 44 is a switch of contact type or proximity type, for example, and is situated in proximity to or contact with the key 34 when the safety door 30 is fully closed (when the key 34 is completely inserted in the key insertion hole 42: see FIG. 3B) and detects that the safety door 30 is fully closed.

The locking mechanism 46 is an electromagnetic solenoid, for example, which displaces a locking member 46a downward when supplied with electricity, and displaces the locking member 46a upward with a biasing member such as a spring, when not supplied with electricity. When the safety, door 30 is fully closed (see FIG. 3B), the locking mechanism 46 is supplied with electricity and then the locking member 46a engages with an engagement portion 341 of the key 34 (see FIG. 3C). In this way, the locking mechanism 46 can switch the safety door 30 between a locked state (the safety door 30 cannot be opened) and an unlocked state (the safety door 30 can be opened) depending on whether it is supplied with electricity or not.

The control unit 50 controls the key switch 40 to protect the safety door device 12 if the safety door 30 closes rapidly. This operation will be described later in detail. The control unit 50 is formed of hardware (CPU: Central Processing Unit) and software, for example, where a control unit of the machine device body may serve also as the control unit 50.

The notification unit 52 is a display unit (e.g., a liquid crystal display), for example, which displays a warning message if the safety door 30 closes rapidly. The notification unit 52 may include an audio output device for outputting sound (e.g., a speaker) in place of, or in addition to, the display unit, in which case the audio output device may output a warning message with sound.

(Details of Control Unit 50)

The details of the control unit 50 will be described below.

When full closing of the safety door 30 is detected, the control unit 50 controls the locking mechanism 46 to lock the safety door 30.

However, even if full closing of the safety door 30 is detected, if the travel acceleration α is greater than a threshold α1 (first threshold), then the, control unit 50 does not cause the safety door 30 to be locked. In this case, the control unit 50 generates a warning signal. On the basis of this warning signal, the notification unit 52 generates a warning message with an image or sound.

On the other hand, if the travel acceleration α is equal to or less than the threshold α1 (first threshold), then the control unit 50 controls the locking mechanism 46 to lock the safety door 30 when full closing of the safety door 30 is detected.

Figure 4:
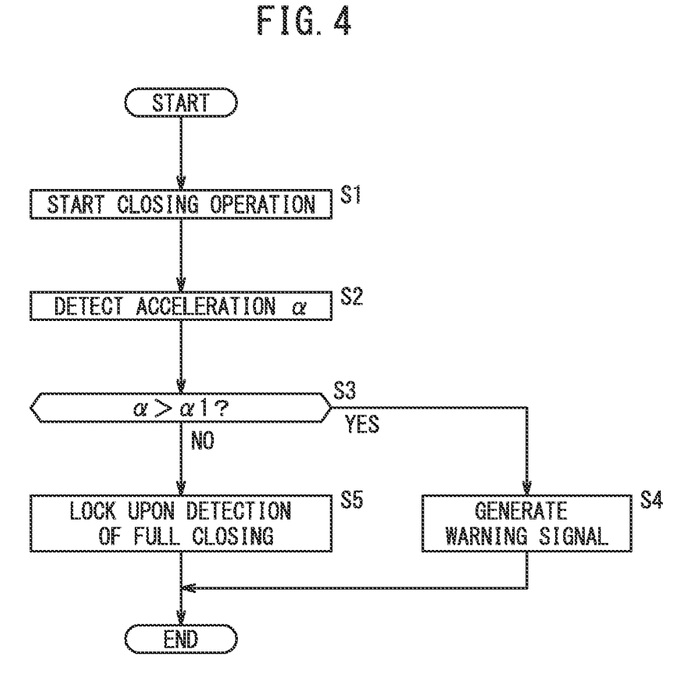
FIG. 4 is a flowchart showing an example of an operation procedure of the safety-door-equipped machine device.

FIG. 4 is a flowchart showing an example of the operation procedure of the safety-door-equipped machine device 10. The operation procedure of the safety-door-equipped machine device 10 will be described referring to FIG. 4.

An operation of closing the safety door 30 is started (step S1). For example, the safety door 30 is moved manually in the closing direction (to the right in FIG. 1 herein). Alternatively, the control unit 50 may move the safety door 30 by controlling a motor.

The acceleration sensor 36 (measurement unit) measures the travel acceleration α (step S2), and the control unit 50 determines whether the travel acceleration α is greater than the threshold α1 (step S3). If the travel acceleration α is greater than the threshold α1, the control unit 50 generates a warning signal (step S4).

Subsequently, the key 34 is inserted in the key insertion hole 42 as the safety door 30 moves in the closing direction. As a result, the full closing detector 44 comes in an ON state and detects full closing of the safety door 30.

If the travel acceleration α is equal to or less than the threshold α1, the control unit 50 supplies the locking mechanism 46 with electricity upon detection of full closing to thereby lock the safety door 30 (step S5). On the other hand, if the travel acceleration α is greater than the threshold α1, the control unit 50 does not cause the safety door 30 to be locked even if full closing is detected.

For the sake of safety, even if the travel acceleration α is equal to or less than the threshold α1, the control unit 50 may lock the safety door 30 not immediately after the detection of full closing of the safety door 30 but. after a given time (e.g., 0.1 to 1 second) has passed after the detection of full closing.

As has been described above, if the travel acceleration α of the safety door 30 is equal to or less than the threshold α1, the safety-door-equipped machine device 10 locks the safety door 30 when the safety door 30 is fully closed. However, the safety-door-equipped machine device 10 does not lock the safety door 30 if the travel acceleration α is greater than the threshold α1. This reduces the possibility of damage to the safety door device 12 which might be caused by an impact when the safety door 30 is rapidly closed and bounces.

If the travel acceleration α is greater than the threshold α1, the safety door device 12 may be damaged by an impact of bouncing of the safety door 30. That is, locking the safety door 30 when the safety door 30 is fully closed may damage the key 34 or the locking mechanism 46 irrespective of the travel acceleration α.

(First Modification)

A first modification will now be described. The embodiment above controls the locking of the safety door 30 by using the travel acceleration α. The first modification controls the locking of the safety door 30 using a travel time T of the safety door 30.

The travel time T can be measured as a time T from the beginning of movement of the safety door 30 to when full closing of the safety door 30 is detected (detection of full closing). This time measurement can be performed by the control unit 50. That is, part of the control unit 50 can function as a time measuring unit for measuring the time T to when full closing of the safety door 30 is detected (detection of full closing).

The beginning of movement of the safety door 30 can be determined by the following methods 1) and 2), for example.

1) Detection of Acceleration

The beginning of movement of the safety door 30 can be determined by the acceleration sensor 36 detecting a value of the acceleration α that exceeds a detection error (threshold α2). That is, the control unit 50 compares the acceleration α detected by the acceleration sensor 36 with the threshold α2, and determines that the safety door 30 has started moving if the acceleration α exceeds the threshold α2. The threshold α2 that is used to determine whether the safety door 30 has started moving is smaller than the threshold α1 that is used to determine whether to lock the safety door 30.

2) Non-detection of Full Opening

The beginning of movement of the safety door 30 can be determined also by the full opening detector 26 losing detection of full opening of the safety door 30 (non-detection of full opening). That is, the control unit 50 determines that the state of the full opening detector 26 has changed from detection of full opening to non-detection thereof.

For example, the control unit 50 can obtain the travel time T as a difference between a time t0 of the beginning of movement of the safety door 30 and a time t1 of detection of full closing of the safety door 30.

$$T = t1 - t0 \qquad \text{equation (1)}$$

Alternatively, the control unit 50 may directly obtain the travel time T without obtaining the individual times t0 and t1, for example by starting a timer when a beginning of movement is detected and stopping the timer when full closing is detected.

Now, an operation procedure of the safety-door-equipped machine device 10 of the first modification will be described. The safety-door-equipped machine device 10 of the first modification operates similarly to the safety-door-equipped machine device 10 of the embodiment, except that it uses the travel time T in place of the travel acceleration α to make the determination as to whether to lock. Accordingly, the difference will mainly be described referring to FIG. 4.

The first modification differs from the embodiment at steps S2, S3, where detection and determination are made with the travel time T instead of the travel acceleration α.

As has been explained above, the control unit 50 obtains the travel time T as the time T from the beginning of movement of the safety doer 30 to when full closing of the safety door 30 is detected (detection of full closing (step S2)).

The control unit 50 determines whether the travel time T is smaller than a threshold T1 (second threshold: T<T1? (step S3)). If the travel time T is smaller than the threshold T1 (second threshold), the control unit 50 generates a warning signal (step S4), and does not cause the safety door 30 to be locked even if full closing is detected. If the travel time T is equal to or greater than the threshold T1 (second threshold), then the control unit 50 causes the safety door 30 to be locked when full closing is detected (or when a given time has passed after the detection (step S5)).

(Second Modification)

Now, a second modification will be described. The implementations above have used the travel acceleration α or travel time T to control the locking of the safety door 30. The second modification uses a travel speed V of the safety door 30 to control the locking of the safety door 30.

The travel speed V can be obtained by the following methods 1) and 2), for example.

1) Integration of Acceleration

The control unit 50 can calculate the travel speed V(t) of the safety door 30 by integrating the travel acceleration α(t) detected by the acceleration sensor 36 with respect to time (integration with respect to time t).

$$V(t)=\int \alpha(t) \cdot dt \qquad \text{equation (2)}$$

In this case, the control unit 50 can calculate variation of the travel speed V(t) over time.

2) Calculation from Travel Time T

The control unit 50 can obtain the travel speed V by dividing a travel distance L of the safety door 30 by the travel time T obtained by the method 1) or 2) of the first modification.

$$V=L/T \qquad \text{equation (3)}$$

The travel distance L can be an appropriate fixed value corresponding to the safety-door-equipped machine device 10.

The second modification does not differ considerably from the embodiment except that the travel speed V is used in place of the travel acceleration α to determine whether to lock. That is, a determination is made as to whether the travel speed V is greater than a threshold V1 (first threshold: V>V1? (step S3)). If the travel speed V is greater than the threshold V1 (first threshold), the control unit 50 generates a warning signal (step S4), and does not cause the safety door 30 to be locked even. when full closing is detected. If the travel speed V is equal to or less than the threshold V1 (first threshold), then the control unit 50 causes the safety door 30 to be locked when full closing is detected (step S5).

As has been described above, the control unit 50 causes the safety door 30 to be locked based on the travel acceleration α, travel time T, or travel speed V of the safety door 30. This reduces the possibility of damage to the locking mechanism etc. due to an impact of bouncing of the safety door 30. That is, the travel acceleration α, travel time T, and travel speed V can all be utilized as physical quantities that correspond to the magnitude of the impact of the bouncing of the safety door 30.

The invention grasped from the above-described embodiments and modifications can be summarized as follows.

[1] A safety door device (12) includes: a full closing detector (44) configured to detect that a safety door (30) has fully closed from an opened state; a locking mechanism (46) configured to lock the safety door so that the safety door does not open; a measurement unit (acceleration sensor 36, control unit 50) configured to measure a travel acceleration (α), a travel speed (V), or a travel time (T) when the safety door closes; and a control unit (50) configured to, when the safety door is detected to be fully closed, control the locking mechanism to lock the safety door, the control unit being further configured not to cause the safety door to be locked if the travel acceleration or the travel speed is greater than a first threshold (α1, V1), or if the travel time is shorter than a second threshold (T1).

Thus, the safety door is not locked if the travel acceleration or the travel speed is greater than the first threshold or if the travel time is shorter than the second threshold, whereby the possibility of damage to the safety door device can be reduced.

[2] The control unit generates a warning signal if the travel acceleration α or the travel speed is greater than the first threshold or if the travel time is shorter than the second threshold.

It is thus possible to give a warning that the safety door device may be damaged. A warning message with an image or sound may be generated on the basis of this warning signal.

[3] The measurement unit may adopt the following configurations.

(1) Measurement of Travel Acceleration

The measurement unit includes an acceleration sensor configured to detect a travel acceleration that is applied to the safety door.

(2) Measurement of Travel Time a) The measurement unit includes: a full opening detector (26) configured to detect that the safety door is fully open; and a time measuring unit configured to measure, as the travel time, a time from when the full opening of the safety door became undetected to when the full closing of the safety door is detected. The safety door device can thus be protected without using an acceleration sensor.

b) The measurement unit includes: an acceleration sensor configured to detect a travel acceleration that is applied to the safety door; and a time measuring unit configured to measure, as the travel time, a time from when the acceleration sensor detected the travel acceleration to when the full closing detector detects the full closing of the safety door. The safety door device can thus be protected on the basis of the travel time without using a full opening detector.

(3) Measurement of Travel Speed a) Calculation of Speed Based on Travel Acceleration The measurement unit includes an integrator configured to calculate the travel speed by integrating the travel acceleration detected by the acceleration sensor.

b) Calculation of Speed Based on Travel Time

The measurement unit may further include a divider configured to calculate the speed (V) by dividing a travel distance (L) of closing of the safety door by the travel time (T).

[4] The control unit causes the safety door to be locked when a given time has passed after the full closing of the safety door is detected, if the travel acceleration or the travel speed is equal to or less than the first threshold or if the travel time is equal to or longer than the second threshold.

Thus, a safer locking operation is possible by locking the safety door after a given time has passed after the detection of full closing.

[5] A safety door locking method uses a safety door device including a full closing detector configured to detect that a safety door has fully closed from an opened state, and a locking mechanism configured to lock the safety door so that the safety door does not open. The safety door locking method includes the steps of: measuring a travel acceleration, a travel speed, or a travel time when the safety door closes; and controlling the locking mechanism to lock the safety door when the safety door is detected to be fully closed, and not to lock the safety door if the travel acceleration or the travel speed is greater than a first threshold, or if the travel time is shorter than a second threshold.

Thus, the safety door is not locked if the travel acceleration or the travel speed is greater than the first threshold or if the travel time is shorter than the second threshold, whereby the possibility of damage to the safety door device can be reduced.

[6] The safety door locking method further includes the step of generating a warning signal if the travel acceleration or the travel speed is greater than the first threshold or if the travel time is shorter than the second threshold. It is thus possible to give a warning that the safety door device may be damaged. A warning message with an image or sound may be generated on the basis of this warning signal.

[7] The safety door device further includes a full opening detector (6) configured to detect that the safety door is fully open, and in the measuring step of the safety door locking method, a time from when the full opening of the safety door became undetected to when the full closing of the safety door is detected is measured as the travel time. The safety door device can thus be protected without using an acceleration sensor.

[8] The safety door locking method includes the step of locking the safety door when a given time has passed after the full closing of the safety door is detected, if the travel acceleration or the travel speed is equal to or less than the first threshold or if the travel time is equal to or longer than the second threshold. Thus, a safer locking operation is possible by locking the safety door after a given time has passed after the detection of full closing.

The safety door device and the safety door locking method according to the present invention are not limited to the above-described embodiments, but can adopt various configurations without departing from the scope of the present invention.

What is claimed is:

1. A safety door device comprising:
   a closing detector configured to detect that a safety door has moved to a closed state from an opened state;
   a locking mechanism configured to lock the safety door so that the safety door does not move to the open state from the closed state;
   a measurement unit configured to measure a travel acceleration of the safety door, a travel speed of the safety door, or a travel time of the safety door when the safety door is moved from the open state to the closed state; and
   a control unit configured to, when the safety door is detected to be in the closed state, control the locking mechanism to lock the safety door, the control unit being further configured not to cause the safety door to be locked if the travel acceleration of the safety door or the travel speed of the safety door is greater than a first threshold, or if the travel time of the safety door is shorter than a second threshold.

2. The safety door device according to claim 1, wherein the control unit is configured to generate a warning signal if the travel acceleration of the safety door or the travel speed of the safety door is greater than the first threshold or if the travel time of the safety door is shorter than the second threshold.

3. The safety door device according to claim 1, wherein the measurement unit includes:
   an opening detector configured to detect that the safety door is in the open state; and
   a time measuring unit configured to measure, as the travel time of the safety door, a time from when the open state of the safety door became undetected to when the safety door is detected to be in the closed state.

4. The safety door device according to claim 1, wherein the control unit is configured to cause the safety door to be locked when a given time has passed after the safety door is detected to be in the closed state, if the travel acceleration of the safety door or the travel speed of the safety door is equal to or less than the first threshold or if the travel time of the safety door is equal to or longer than the second threshold.

5. The safety door device according to claim 1, wherein a measurement of the travel acceleration of the safety door, the travel speed of the safety door, or the travel time of the safety door is based on movement of the safety door relative to an opening as the safety door moves from the open state to the closed state for closing the opening.

6. A safety door locking method which uses a safety door device including a closing detector configured to detect that a safety door has moved to a closed state from an opened state, and a locking mechanism configured to lock the safety door so that the safety door does not move to the open state from the closed state, the safety door locking method comprising the steps of:
   measuring a travel acceleration of the safety door, a travel speed of the safety door, or a travel time of the safety door when the safety door is moved from the open state to the closed state; and
   controlling the locking mechanism to lock the safety door when the safety door is detected to be in the closed state, and not to lock the safety door if the travel acceleration of the safety door or the travel speed of the safety door is greater than a first threshold, or if the travel time of the safety door is shorter than a second threshold.

7. The safety door locking method according to claim 6, further comprising a step of generating a warning signal if the travel acceleration of the safety door or the travel speed of the safety door is greater than the first threshold or if the travel time of the safety door is shorter than the second threshold.

8. The safety door locking method according to claim 6, wherein
   the safety door device further includes an opening detector configured to detect that the safety door is in the open state, and
   in the measuring step, a time from when the open state of the safety door became undetected to when the safety door is detected to be in the closed state, is measured as the travel time.

9. The safety door locking method according to claim 6, further comprising a step of locking the safety door when a given time has passed after the safety door is detected to be in the closed state, if the travel acceleration of the safety door or the travel speed of the safety door is equal to or less than the first threshold or if the travel time of the safety door is equal to or longer than the second threshold.

10. The safety door locking method according to claim 6, further comprising basing a measurement of the travel acceleration of the safety door, the travel speed of the safety door, or the travel time of the safety door on movement of the safety door relative to an opening as the safety door moves from the open state to the closed state for closing the opening.

* * * * *

UNITED STATES PATENT AND TRADEMARK OFFICE
CERTIFICATE OF CORRECTION

PATENT NO. : 11,891,840 B2
APPLICATION NO. : 17/123660
DATED : February 6, 2024
INVENTOR(S) : Keita Asano It is certified that error appears in the above-identified patent and that said Letters Patent is hereby corrected as shown below:

In the Specification

Column 2, Line 3:
"FIGS. 3A, 3B and 30"
Should read:
-- FIGS. 3A, 3B and 3C --

Signed and Sealed this
Twenty-sixth Day of March, 2024

Katherine Kelly Vidal
*Director of the United States Patent and Trademark Office*